United States Patent [19]

MacMinn

[11] Patent Number: 4,642,543
[45] Date of Patent: Feb. 10, 1987

[54] STARTING SEQUENCE FOR RELUCTANCE MOTOR DRIVES OPERATING WITHOUT A SHAFT POSITION SENSOR

[75] Inventor: Stephen R. MacMinn, Schenectady, N.Y.

[73] Assignee: General Electric Company, Schenectady, N.Y.

[21] Appl. No.: 806,902

[22] Filed: Dec. 9, 1985

[51] Int. Cl.[4] .............................................. H02P 8/00
[52] U.S. Cl. ..................................... 318/696; 318/685
[58] Field of Search ................ 318/696, 685, 138, 254

[56] References Cited

U.S. PATENT DOCUMENTS

| | | | |
|---|---|---|---|
| 4,096,420 | 6/1978 | Gorling et al. | 318/254 |
| 4,251,758 | 2/1981 | Pedersen et al. | 318/254 |
| 4,454,458 | 6/1984 | Holland | 318/254 |
| 4,455,513 | 6/1984 | Fulton et al. | 318/138 |

Primary Examiner—William M. Shoop, Jr.
Assistant Examiner—Saul M. Bergmann
Attorney, Agent, or Firm—Marvin Snyder; James C. Davis, Jr.

[57] ABSTRACT

A reluctance motor is started from standstill and accelerated to the rated speed of the motor without using a shaft position sensor. In this type of reluctance drive, if the motor fails to start and loses synchronism with the stepping commands, the resulting average current drawn by the motor will exceed the current drawn if the motor were in synchronism. If such excessive current is sensed, the starting sequence is re-tried.

11 Claims, 3 Drawing Figures

STARTING SEQUENCE FOR RELUCTANCE MOTOR DRIVES OPERATING WITHOUT A SHAFT POSITION SENSOR

This application is related to Miller et al., U.S. application Ser. No. 699,537, filed Feb. 8, 1985, entitled "Switched Reluctance Motor Drive Operating Without a Shaft Position Sensor", and of common assignment, which is hereby incorporated by reference in its entirety.

BACKGROUND OF THE INVENTION

The present invention relates in general to operating a variable reluctance motor and more specifically to reliably starting and accelerating to rated speed a variable reluctance motor operating without a shaft position sensor.

Variable reluctance motors have poles or teeth on both the stator and the rotor (i.e. they are doubly salient). There are windings on the stator but no windings on the rotor. Each pair of diametrically opposite stator windings is connected in series to form one phase of the motor.

Torque is produced by switching current on in the stator phases in a predetermined sequence so that a magnetic force of attraction results between a pair of rotor poles and the stator poles that are being energized. The switched reluctance motor is a variable reluctance motor in which the current is switched off in each pair of stator windings at the commutation point before the approaching rotor poles rotate past the aligned position.

Each time a phase of the switched reluctance motor is switched on by closing a switch in a power converter, current flows in the pair of stator windings, providing energy from a DC supply to the motor. The energy drawn from the supply is converted partly into mechanical energy, by causing the rotor to rotate towards a minimum reluctance configuration, and partly into a stored magnetic field. When the switch is opened, part of the stored magnetic energy is converted to mechanical output and the remainder of the energy is preferably returned to the DC souce.

The converter must switch the phase currents on and off in synchronism with rotor position. This "shaft-position switching" is normally accomplished using a shaft position sensor by referencing the switching of the transistors in each converter leg to a set of pulses derived from the shaft position sensor. One example of a shaft position sensor is a fixed light source and a fixed light detector on opposite planar sides of a slotted disc connected to the shaft which optically interrupts the light beam between the source and the detector in accordance with the position of the shaft. The shaft position sensor is undesirable in small motors because of its cost, and in both large and small motors because of its space requirement and the vulnerability of the signal wires that must run between the motor and the electronic power converter.

Copending application Ser. No. 699,537, teaches that the average dc link current supplied to the power converter is substantially proportional to load torque and may be used as a feedback variable for controlling the motor (i.e. closed-loop control) without shaft position sensing. However, a controller which regulates averaged quantities will only work when the motor is running substantially at rated speed. Therefore, additional means are needed to start the motor.

It is known from variable reluctance stepper motor theory that a motor will follow (i.e. be started from) a fixed-rate stepping sequence from standstill provided that the stepping rate does not exceed a limit known as the starting rate, and further provided that the stepping rate does not coincide with a mechanical resonance of the drive system. The magnitude of the starting rate depends on the particular motor used, supply voltage, load and temperature.

Design procedure for open-loop stepper motors is to determine the starting rate and then to start the motor at a stepping rate well known below the starting rate to allow for changes in the parameters determining starting rate. The designer must also insure that the chosen stepping rate does not coincide with a resonant mechanical frequency of the system. For a stepping motor whose step angle is small compared to its rotor tooth pitch, stepping rates near a resonant mechanical frequency will result in a position error without the motor losing synchronism, a relatively minor problem. However, some types of variable reluctance motors (including switched reluctance motors) have a step angle that is a large fraction of its rotor tooth pitch (e.g. $\frac{1}{3}$). These motors can easily lose synchronism if the stepping rate is near a resonant mechanical frequency of the system, resulting in failure to start.

Accordingly, it is a principal object of the present invention to provide method and apparatus to reliably start a reluctance motor from standstill and accelerate the motor to a desired speed, without the need for a shaft position sensor.

It is another object of the invention to provide a starting sequence adapted to be used with a switched reluctance motor using average total current as a feedback variable in closed-loop operation.

It is a further object of the invention to detect any failure to start a multiphase motor and to recommence the starting sequence in response to such failure.

SUMMARY OF THE INVENTION

These and other objects are achieved by a controller for a multiphase motor comprising current sensing means, state sequencing means and phase sequencing means. The current sensing means is adapted to be coupled to the motor for providing an indicating signal when the average total current flowing in the motor exceeds a predetermined value. The state sequencing means is coupled to the current sensing means and generates a sequence of starting signals. The sequence of starting signals comprises an align signal, a check signal and a ramp signal. The check signal follows a predetermined starting delay after the end of the align signal. The ramp signal follows the check signal if the indicating signal is absent during the check signal. The align signal follows the check signal if the indicating signal is present during the check signal. The phase sequencing means is coupled to the state sequencing means and is adapted to be coupled to the motor for energizing a predetermined stator phase of the motor in response to the align signal, for stepping the stator phases at a starting-rate frequency during the starting delay and the check signal, and for increasing the stepping rate of the stator phases from the starting-rate frequency to a desired running frequency in response to the ramp signal.

In another aspect, the invention pertains to a method for starting a reluctance motor comprising the steps of (1) aligning the motor rotor by energizing a predetermined stator phase, (2) stepping the stator phases at about the starting rate of the motor for a predetermined starting delay, (3) checking the average total current flowing in the motor and returning to the aligning step if the average exceeds a predetermined value, and (4) ramping up the stepping rate to a desired running frequency.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

The invention takes advantage of an observed property of switched reluctance drives, namely that if the rotor loses synchronism with the phase step commands, the resulting average total current drawn by the motor phases will be higher than if the rotor were in synchronism. Thus, a loss of synchronism can be detected by sensing an excessive current level.

Figure 1:
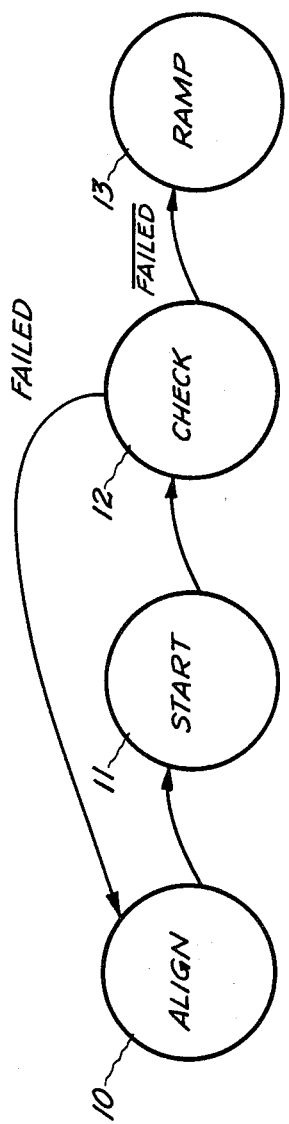
FIG. 1 is a state diagram illustrating the method of the present invention.

An exemplary method of the invention is shown by the state-transition diagram of FIG. 1. In step 10, a predetermined stator phase is energized in order to align a pair of rotor poles with the energized phase. In step 11, the stator phases are stepped at a predetermined starting-rate frequency for a predetermined starting delay. The length of the starting delay is chosen to allow sufficient time for a valid starting attempt and may be on the order of a few seconds. In step 12, the average total current flowing in the motor is checked against a predetermined value which represents a loss of synchronism. If total current exceeds the predetermined value (i.e. the starting attempt has failed) then the method returns to step 10. If the total current does not exceed the predetermined value (i.e. the motor has successfully started) then step 13 is executed. In step 13, the stepping rate of the stator phases is ramped up to a desired running frequency (e.g. rated speed) of the motor.

Figure 2:
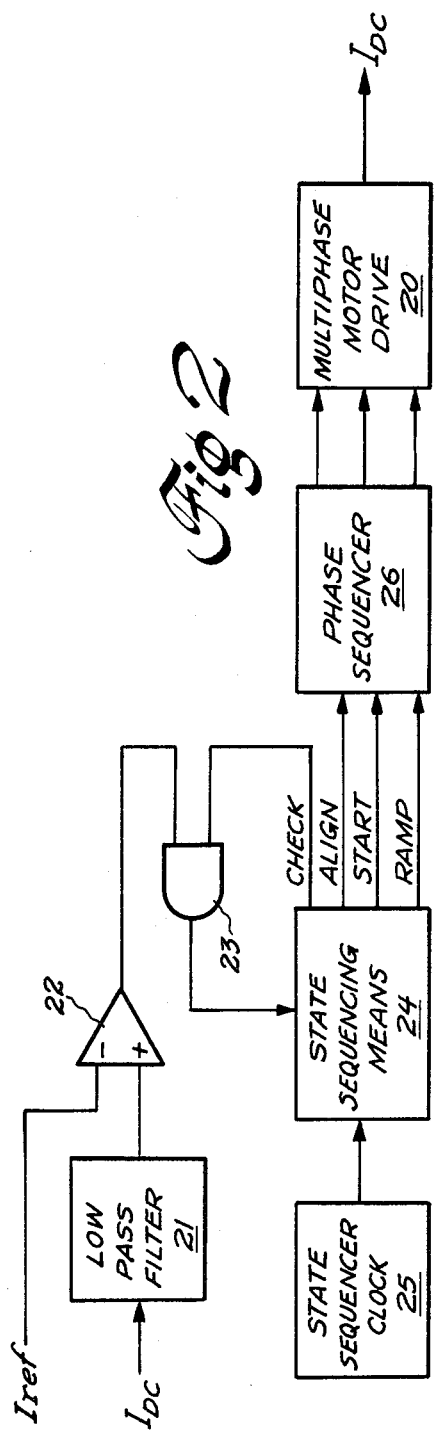
FIG. 2 is a block diagram illustrating the apparatus of the invention.

Apparatus of the invention is shown in the functional block diagram of FIG. 2 to include a multiphase motor drive 20. A feedback current signal $I_{DC}$ representing instantaneous total current in the motor of drive 20 is provided by a current shunt or other means to a low-pass filter 21. The output of low-pass filter 21 is coupled to the noninverting input of a comparator 22. The inverting input receives signal $I_{ref}$ which represents the predetermined value for testing loss of synchronism. The output of comparator 22 is coupled to one input of a two-input AND gate 23. The output of AND gate 23 is coupled to a state sequencing means 24.

State sequencing means 24 generates ALIGN, START, CHECK and RAMP signals and is under the control of a state sequencer clock 25. The CHECK signal is coupled to the remaining input of AND gate 23. The ALIGN, START and RAMP signals are coupled to a phase sequencer 26. Phase sequencer 26 provides a plurality of signals to motor drive 20, each respective signal being coupled to a respective stator phase of drive 20 for energizing the respective stator phase.

In operation, state sequencing means 24 is initialized to its ALIGN state by a switch or an input signal (not shown). In response to the ALIGN signal, phase sequencer 26 energizes one stator phase to align the rotor in a known position. After a time determined by sequencer clock 25, state sequencing means 24 transitions to the START state. In response to the START signal, phase sequencer 26 steps the stator phases at about the starting rate of the motor for a starting delay determined by sequencer clock 25 and state sequencing means 24. When state sequencing means 24 transitions to the CHECK state, phase sequencer 26 continues to step the phases at about the starting rate.

While motor drive 20 is being stepped at about its starting rate, current signal $I_{DC}$ is applied to low-pass filter 21. The output signal of low-pass filter 21 is proportional to the average total current flowing in the motor. That signal is compared to $I_{ref}$ by comparator 22 such that the output signal of comparator 22 is low as long as the average total current does not exceed the predetermined value and is high when the predetermined value is exceeded. Thus, the output signal of comparator 22 indicates a loss of synchronism in the motor.

If the output signal of comparator 22 is high when state sequencing means 24 is in its CHECK state, then the output signal of AND gate 23 will go high. In response to a high output from AND gate 23, state sequencing means 24 resets to its ALIGN state so that the starting sequence can be re-tried.

If state sequencing means 24 is not reset during the CHECK state, it will transition to the RAMP state since the starting attempt will have been successful. In response to the RAMP signal, phase sequencer 26 accelerates the motor to rated speed or any other desired speed, or alternatively could operate the motor at any commanded speed or speed curve.

Figure 3:
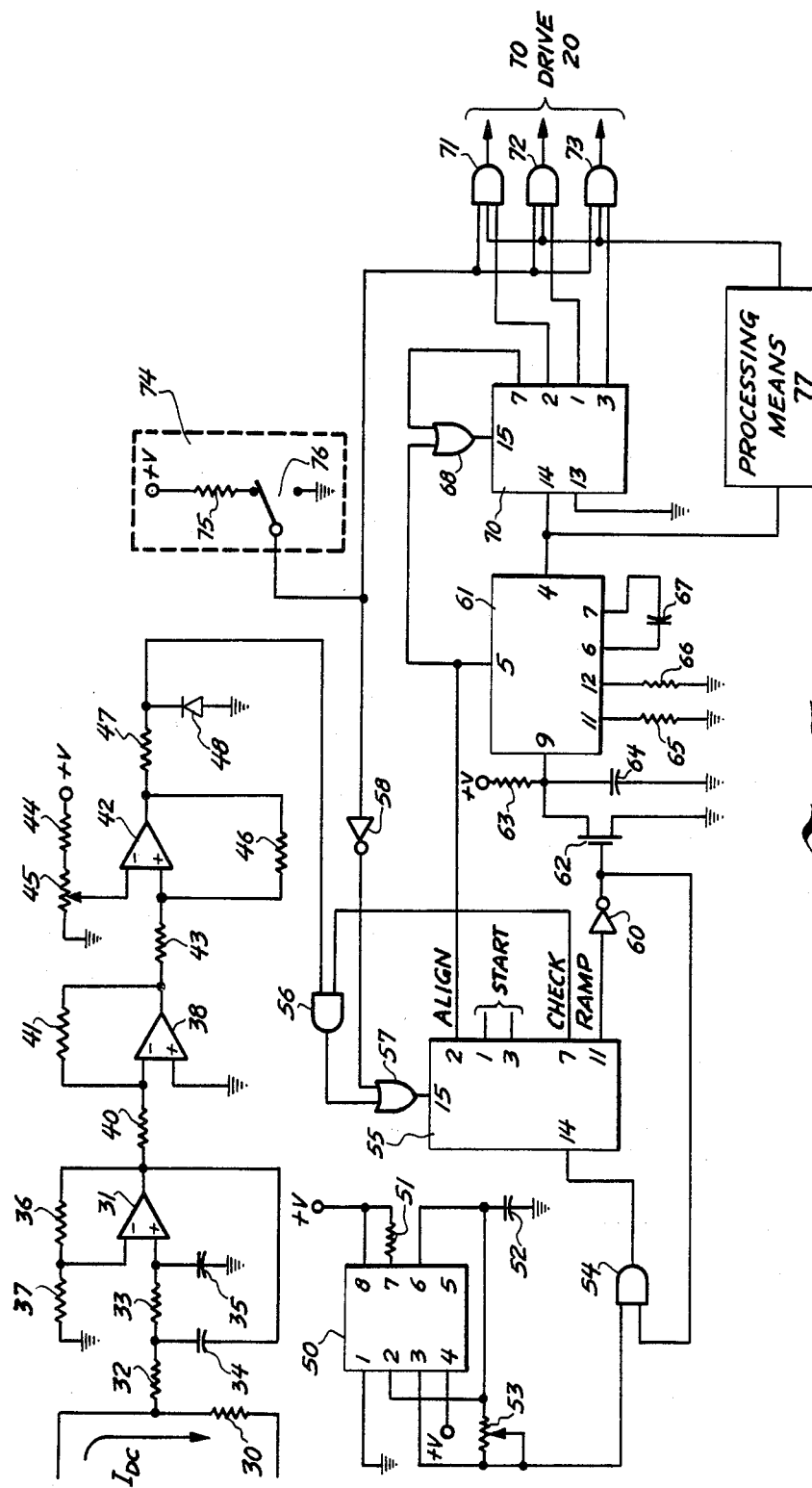
FIG. 3 is a schematic diagram showing the apparatus of FIG. 2 in greater detail.

A detailed embodiment of an apparatus of the invention is shown in FIG. 3. A current-shunt resistor 30 is connected to the motor drive and provides signal $I_{DC}$ which is coupled to the noninverting input of an operational amplifier 31 through resistors 32 and 33. The junction of resistors 32 and 33 is coupled to the output of amplifier 31 by a capacitor 34. A capacitor 35 is connected between the noninverting input of amplifier 31 and circuit common. The inverting input of amplifier 31 is coupled to the output of amplifier 31 through a resistor 36 and to circuit common through a resistor 37.

The output of amplifier 31 is coupled to the inverting input of an operational amplifier 38 through a resistor 40. A resistor 41 couples the inverting input to the output of amplifier 38. The noninverting input of amplifier 38 is connected to circuit common.

The output of amplifier 38 is coupled to the noninverting input of a comparator 42 through a resistor 43. The inverting input of comparator 42 is connected to the output of a voltage divider comprised of a resistor 44 and a potentiometer 45. Resistor 44 is connected to a DC voltage $+V$ which can be provided by a voltage regulator (not shown). A resistor 46 couples the noninverting input to the output of comparator 42. A resistor 47 couples the output of comparator 42 to one input of a two-input AND gate 56. A clamping diode 48 has its cathode connected to resistor 47 and its anode connected to circuit common.

In the circuit described above, amplifier 31 and its associated circuitry comprise a low-pass filter. Amplifier 38 and its associated circuitry couples the output of the low-pass filter to comparator 42 with a known gain. $I_{ref}$ is set by potentiometer 45 so that the output signal from comparator 42 will be high if the motor loses synchronism.

Also shown in FIG. 3 is a sequencer clock 50, shown, for example, as a CA555 integrated circuit manufactured by RCA, which provides precise clock signals at a controlled frequency. A resistor 51 couples PIN 7 to +V. A capacitor 52 couples PINs 2 and 6 to circuit common. A potentiometer couples PIN 3 to PIN 2. PINs 4 and 8 are connected to +V and PIN 1 is connected to circuit common. PIN 3 provides clock signals having a predetermined frequency (e.g. on the order of one pulse per second for some applications). PIN 3 is coupled to one input of a two-input AND gate 54.

The output of AND gate 54 is connected to PIN 14 (clock input) of a state sequencer 55, which may be a CD4022A counter/divider integrated circuit manufactured by RCA. The CD4022A provides a plurality of decoded output signals such that each output signal is high only in its respective sequential time slot. PIN 2 provides the ALIGN signal. PINs 1 and 3 are unused so as to provide the desired starting delay. Since two sequential outputs are used for the starting delay, the delay will be equal to two periods of sequencer clock 50. The CHECK signal is provided at PIN 7 which is coupled to the remaining input of AND gate 56. The output of AND gate 56 is connected to one input of an OR gate 57. The output of OR gate 57 is coupled to PIN 15 (reset) of state sequencer 55. PIN 11 provides the RAMP signal and is coupled to the input of an inverter 60. The output of inverter 60 is coupled to the remaining input of AND gate 54.

The output of inverter 60 is also coupled to the control input (i.e. gate terminal) of a field-effect transistor (FET) 62. FET 62 has one output terminal connected to circuit common and its other output terminal coupled to PIN 9 (the control-voltage input) of a voltage-controlled oscillator (VCO) 61, which may be a CD4046A phase-locked loop integrated circuit manufactured by RCA. PIN 9 is coupled to +V through a resistor 63 and to circuit common through a capacitor 64. PIN 5 (oscillator-INHIBIT) is supplied with the ALIGN signal from state sequencer 55. PINs 11 and 12, respectively, are coupled to circuit common through resistors 65 and 66, respectively, and PIN 7 is coupled to PIN 6 by a capacitor 67 for determining the minimum and maximum frequencies supplied at PIN 4 (VCO OUT) of VCO 61.

PIN 4 of VCO 61 is coupled to PIN 14 (clock input) of a phase timer 70, which may be a CD4022A counter/divider. The ALIGN signal from state sequencer 55 is coupled to one input of a two-input OR gate 68. The other input of OR gate 68 is coupled to PIN 7 (decoded output 3) of phase timer 70 and the output of OR gate 68 is coupled to PIN 15 (RESET). PIN 13 (clock INHIBIT) is connected to circuit common. PINs 2, 1 and 3 (decoded outputs 0, 1 and 2, respectively) are each coupled to one input of AND gates 71, 72, and 73, respectively. The outputs of AND gates 71-73 are each coupled to a respective stator phase to energize the stator phases in the sequence provided by phase timer 70.

A switch means 74 is coupled to each of AND gates 71-73, respectively, and employs a single-pole double-throw switch 76 such that the output of switch means 74 may be selectively connected to circuit common or coupled to +V through a resistor 75 by switch 76. The output of switch 76 is connected to an input of each AND gate 71-73 and is connected to the input of an inverter 58. The output of inverter 58 is coupled to the remaining input of OR gate 57. Thus, with switch 76 in its off position, the output signal of switch means 74 is low and the output signals of AND gates 71-73 are all low. At the same time, the outputs of inverter 58 and OR gate 57 are high so that state sequencer 55 is continually reset to its ALIGN state and phase timer 70 is reset to a predetermined phase. When switch 76 is placed in its on position, switch means 74 provides a run signal with a high voltage level which enables AND gates 71-73 and which removes the reset signal from state sequencer 55.

In operation, when the run signal is first applied, a predetermined stator phase is energized since phase timer 70 continues to be reset by the ALIGN signal. Prior to the time that state sequencing means 55 enters the RAMP state, the output of inverter 60 is high to allow clock signals from sequencer clock 50 to be transmitted to state sequencing means 55 through AND gate 54. At the next clock pulse, state sequencing means 55 enters the START state and the ALIGN signal goes low. The allows VCO 61 to begin producing an output signal and allows phase timer 70 to change state at each output pulse from VCO 61. Since the output signal from inverter 60 is high, FET 62 is turned on, thus coupling PIN 9 of VCO 61 to circuit common. Therefore, VCO 61 produces output pulses at the predetermined minimum frequency (i.e. starting-rate frequency).

After the starting delay, state sequencing means 55 enters the CHECK state so that it can be reset to the ALIGN state if comparator 42 indicates that the motor has lost synchronism. Once the motor has successfully started, state sequencing means 55 enters the RAMP state, causing the output signal from inverter 60 to go low. The output signal from AND gate 54 also goes low and prevents any clock pulses from reaching state sequencing means 55 which otherwise would terminate the RAMP state.

When the output signal from inverter 60 goes low, FET 62 turns off. Capacitor 64 then charges up to voltage +V at a rate determined by the RC time constant of resistor 63 and capacitor 64. Thus, the output frequency of VCO 61 ramps up from its minimum to its maximum frequency. The ramp slope determined by capacitor 64 and resistor 63 must not exceed the capabilities of the motor to follow the accelerating step commands.

FIG. 3 also shows a processing means 77 coupled between the output of VCO 61 and the inputs of AND gates 71-73. Processing means 77 can be employed to improve motor efficiency by controlling the dwell angle for which each stator phase is energized, as is described in the copending application mentioned above.

The foregoing describes method and apparatus for reliably starting a reluctance motor from standstill and accelerating the motor to a desired speed without the need for a shaft position sensor. A starting sequence is provided which is adapted to be used with a switched reluctance motor using average total current as a feedback variable in closed-loop operation, and with other types of motor drives as well. The invention detects any failures to start the multiphase motor and recommences the starting sequence in response to the failure.

While preferred embodiments of the present invention have been shown and described herein, it will be obvious that such embodiments are provided by way of example only. Numerous variations, changes and substitutions will occur to those skilled in the art without departing from the spirit of the invention. Accordingly, it is intended that the appended claims cover all such variations as fall within the spirit of the invention.

What is claimed is:

1. A controller for a multiphase motor comprising:
   current sensing means adapted to be coupled to said motor for providing an indicating signal when the average total current flowing in said motor exceeds a predetermined value;
   state sequencing means coupled to said current sensing means for generating a sequence of starting signals, said sequence comprising an align signal, a check signal and a ramp signal, said check signal following a predetermined starting delay after the end of said align signal, said ramp signal following said check signal if said indicating signal is absent during said check signal, said align signal following said check signal if said indicating signal is present during said check signal; and
   phase sequencing means coupled to said state sequencing means and adapted to be coupled to said motor for energizing a predetermined stator phase of said motor in response to said align signal, for stepping the stator phases of said motor at a predetermined frequency during said starting delay and during said check signal, and for increasing the stepping rate of said stator phases from said predetermined frequency to a desired running frequency in response to said ramp signal.

2. A controller for a multiphase motor comprising:
   current sensing means adapted to be coupled to said motor for providing an indicating signal when the average total current flowing in said motor exceeds a predetermined value;
   sequencing means coupled to said current sensing means and responsive to a run signal for generating a sequence of starting signals in response to said run signal, said sequence comprising an align signal, a check signal and a ramp signal, said check signal following a predetermined starting delay after the end of said align signal, said ramp signal following said check signal if said indicating signal is absent during said check signal, said align signal following said check signal if said indicating signal is present during said check signal;
   oscillator means coupled to said sequencing means for generating a variable frequency output signal, said output signal being inhibited by said align signal, said output signal having a predetermined frequency during said starting delay and having a frequency which ramps up from said predetermined frequency to a running frequency in response to said ramp signal; and
   phase timing means coupled to said sequencing means and to said oscillator means and adapted to be coupled to said motor for energizing a predetermined phase of said motor during said align signal and for selectively stepping the phases of said motor at the frequency of said variable frequency output signal.

3. The controller of claim 2 further comprising switch means coupled to said sequencing means and to said phase timing means for selectively generating said run signal and for inhibiting the output signals of said phase timing means when said run signal is absent.

4. The controller of claim 2 further comprising an AND gate having one input coupled to said current sensing means for receiving said indicating signal and having another input coupled to said sequencing means for receiving said check signal, the output of said AND gate being coupled to said sequencing means so as to return said sequencing means to said align signal output condition in response to the output signal of said AND gate.

5. The controller of claim 2 wherein said sequencing means includes a sequencer clock for determining the timing of said starting signals.

6. The controller of claim 2 wherein said oscillator means comprises:
   a voltage-controlled oscillator adapted to provide said variable frequency output signal at a frequency from said predetermined frequency to said running frequency in accordance with the voltage at its control-voltage input;
   an inverter coupled to said sequencing means for inverting said ramp signal;
   a semiconductor switch having its control input coupled to the output of said inverter, having one output terminal coupled to said control-voltage input of said voltage-controlled oscillator and having its other output terminal coupled to circuit common;
   a capacitor coupled between said control-voltage input and circuit common; and
   a resistor for coupling said control-voltage input to a source of DC voltage.

7. The controller of claim 6 wherein the output of said inverter is coupled to said sequencing means so as to prevent said clock from terminating said ramp signal.

8. The controller of claim 2 wherein said current sensing means comprises:
   a low pass filter having an input adapted to be coupled to said motor drive; and
   a comparator coupled to the output of said low pass filter, said comparator providing said indicating signal when the output signal of said low pass filter exceeds a threshold value.

9. A reluctance drive comprising:
   a reluctance motor having a plurality of phase windings;
   current sensing means adapted to be coupled to said drive for providing an indicating signal when the average total current flowing in said drive exceeds a predetermined value;
   sequencing means coupled to said current sensing means and responsive to a run signal for generating a sequence of starting signals in response to said run signal, said sequence comprising an align signal, a check signal and a ramp signal, said check signal following a predetermined starting delay after the end of said align signal, said ramp signal following said check signal if said indicating signal is absent during said check signal, said align signal following said check signal if said indicating signal is present during said check signal;
   oscillator means coupled to said sequencing means for generating a variable frequency output signal, said output signal being inhibited by said align signal, said output signal having a predetermined frequency during said starting delay and having a frequency which ramps up from said predetermined frequency to a running frequency in response to said ramp signal; and phase timing means coupled to said sequencing means, to said oscillator means and to said reluctance motor for energizing a predetermined phase of said motor during said align signal and for selectively stepping the phases of said motor at the frequency of said variable frequency output signal.

10. The reluctance drive of claim 9 further comprising processing means coupled to said phase timing means and said oscillator means for adjusting the dwell angle of the output signals from said phase timing means.

11. A method of starting a reluctance motor comprising the steps of:
- aligning the rotor of said motor by energizing a predetermined stator phase;
- stepping the stator phases of said motor at about the starting rate of said motor for a predetermined starting delay;
- checking the average total current flowing in said motor and returning to said aligning step if said average exceeds a predetermined value;
- ramping up the stepping rate of said stator phases to a desired running frequency of said motor.

* * * * *